(12) United States Patent
Yoshida

(10) Patent No.: US 6,510,139 B1
(45) Date of Patent: Jan. 21, 2003

(54) NETWORK MANAGEMENT SYSTEM WITH NETWORK DESIGNING FUNCTION

(75) Inventor: Makiko Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/138,181

(22) Filed: Aug. 21, 1998

(30) Foreign Application Priority Data

Aug. 22, 1997 (JP) .............................................. 9-226764

(51) Int. Cl.⁷ .......................... H04L 1/00; G06F 15/177
(52) U.S. Cl. ...................... 370/238; 370/254; 709/220; 709/241
(58) Field of Search ............................... 370/235, 238, 370/252, 389, 392, 400, 254, 351; 709/241, 220, 221, 222, 223, 224, 226

(56) References Cited

U.S. PATENT DOCUMENTS

| | | | | |
|---|---|---|---|---|
| 5,038,340 A | * | 8/1991 | Ochiai | 370/238 |
| 5,317,566 A | * | 5/1994 | Joshi | 370/238 |
| 5,381,404 A | * | 1/1995 | Sugano et al. | 370/238 |
| 5,404,451 A | * | 4/1995 | Nemirovsky et al. | 370/238 |
| 5,471,467 A | * | 11/1995 | Johann | 370/238 |
| 5,502,816 A | * | 3/1996 | Gawlick et al. | 370/351 |
| 5,583,860 A | * | 12/1996 | Iwakawa et al. | 370/232 |
| 5,649,108 A | * | 7/1997 | Spiegel et al. | 370/400 |
| 5,745,694 A | * | 4/1998 | Egawa et al. | 709/104 |
| 5,838,660 A | * | 11/1998 | Croslin | 370/252 |
| 5,940,373 A | * | 8/1999 | Chiu et al. | 370/238 |
| 5,970,050 A | * | 10/1999 | Johnson | 370/238 |
| 6,104,701 A | * | 8/2000 | Avargues et al. | 370/238 |

FOREIGN PATENT DOCUMENTS

JP 8-328984 12/1996

OTHER PUBLICATIONS

"Network Design Method For the Effective Use Of Pre-Existing Equipment", 1997 Conference of the Electronic Data Communication Society, B-7-31, Aug. 13, 1997, by Hisayuki Tabe, et al.
"ATM Network Design Appraisal System" Communication Science Technical Journal IN 94-122.
J. P. Wong, et al., A Diameter Based Method for Virtual Path Layout in ATM Networks, pp. 502-512 ca. 1995.

* cited by examiner

Primary Examiner—Chau Nguyen
Assistant Examiner—Andrew Lee
(74) Attorney, Agent, or Firm—Scully, Scott, Murphy & Presser

(57) ABSTRACT

A network management method provides optical performance and configuration management to satisfy user demands. Network information of the network is stored for retrieval and, when inputting a plurality of user demands each for a change of performance of the network, a modified design of the network is provided based on the network information to satisfy the user demands.

11 Claims, 9 Drawing Sheets

NETWORK MANAGEMENT SYSTEM WITH NETWORK DESIGNING FUNCTION

BACKGROUND OF THE INVENTION

1. Field of the Invention

The present invention generally relates to a network management system, and in particular to system and method which manage the network based on the capabilities and operation states of network components.

2. Description of the Related Art

There has been disclosed an example of a conventional network management system in Japanese Patent Unexamined Publication No. 8-328984. According to the conventional system, the network information regarding the capabilities and operation states of network components is collected from the existing network using a management protocol such as SNMP (Simple Network Management Protocol). The collected network information is stored onto a network database. In the case where the network is modified on demand, a simulation of the modified network is performed using the network database prior to actually making a modification to the existing network. In this manner, it can be determined in advance whether the simulation of the modified network provides the expected performance. If the modified network is good in the simulation, the modification is made to the existing network.

However, if the simulation of the modified network does not provide acceptable performance, it is necessary for a network manger to redesign the modification of the network and then to perform the simulation of the redesigned network again. This is a time-consuming and inefficient procedure.

SUMMARY OF THE INVENTION

An object of the present invention is to provide network management system and method which can automatically perform the redesign of a network in response to user's demands, Another object of the present invention is to provide management system and method which can automatically produce an optimal plan for updating the settings of network components.

According to the present invention, network information of the network is stored for retrieval and, when inputting a plurality of demands each for a change of performance of the network, a modified design of the network is provided based on the network information to satisfy the demands.

An initially-modified design of the network may be produced by determining a minimum-cost route for each of the demands, end then the initially-modified design may be optimized to produce the modified design by changing the minimum-cost route for each of the demands so that cost of modification of the network is minimized as a whole.

Since the modified design of the network is provided based on the network information to satisfy the demands, optimal performance and configuration management to satisfy the demands can be automatically obtained.

DETAILED DESCRIPTION OF THE PREFERRED EMBODIMENTS

Figure 1:
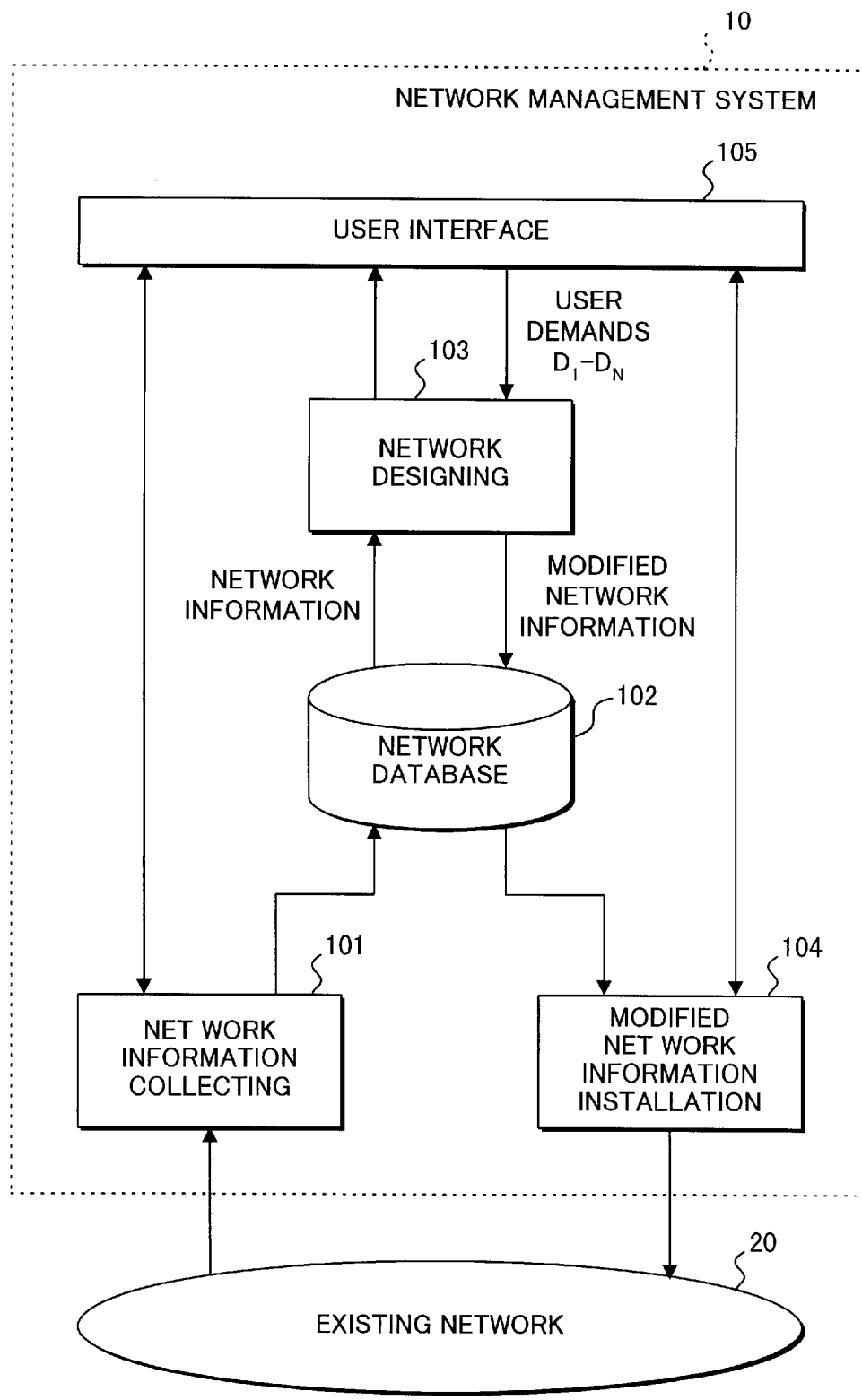
FIG. 1 is a block diagram showing a network management system according to a first embodiment of the present invention.

Referring to FIG. 1, a network management system 10 according to an embodiment of the present invention collects performance and other information about the existing network 20 or about particular nodes on the network 20. Further, the network management system 10 performs network redesigning on user demands and network information installation as will be described hereinafter.

The network management system 10 is provided with a network information collecting section 101 which collects at least information required for network redesigning from the existing network 20 or particular nodes on the network 20. The network information includes configuration information, that is, states, settings, capabilities about nodes and links and topology information and may further include traffic information indicating the level of network activity in the network 20 or in each link. The collected network information is stored onto a network database 102 for later retrieval.

The network management system 10 is further provided with a network designing section 103 which inputs the collected network information from the network database 102 and redesigns the network so as to satisfy the user demands received from the user interface 105. The network designing section 103 may be comprised of a program-controlled processor, a read-only memory storing a network designing program, and a memory for storing input user demands, network information and other information. These circuit blocks are not shown in FIG. 1.

The modified network information including modified settings, capabilities and other data about nodes and links is stored onto the network database 102 and a modified network information installation section 104 writes or installs the modified network information into nodes of the network 20.

Since the network information collecting section 101 and the modified network information installation section 104 have been known, the details are omitted. The user interface 105 may be comprised of an input device, a monitor for displaying necessary information, and other devices. The input device is used to input various instructions such as network information collecting instruction, network information installation instructions, network designing instruction and further to input user demands.

Figure 2:
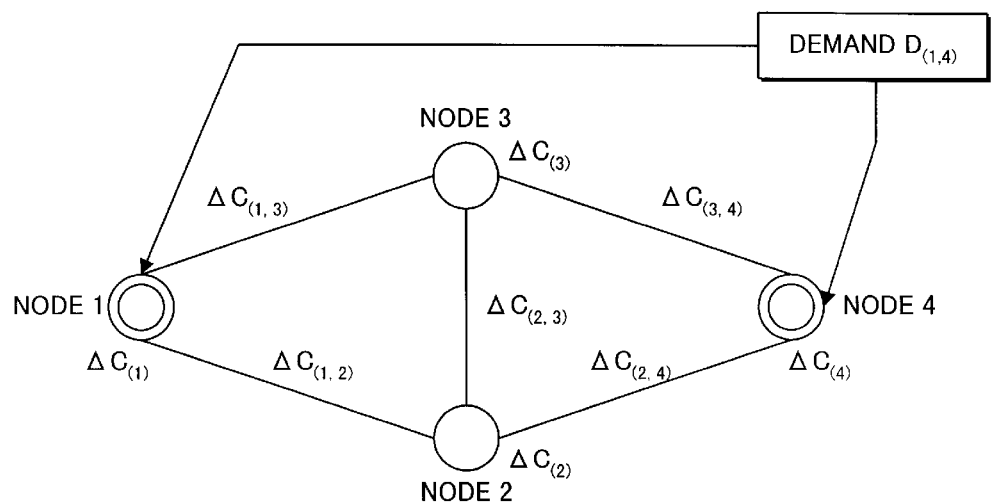
FIG. 2 is a diagram showing a schematic configuration of a network for explanation an operation of the embodiment.

As shown in FIG. 2, consider for simplicity that a network consisting of four nodes NODE1–NODE4 is operating kith initial settings of the nodes. For example, in the case of occurrence of a demand D(1,4) specifying two nodes NODE1 and NODE4 and a requested bandwidth it is necessary to modify the settings and capabilities of nodes and links of a selected route between NODE1 and NODE4 to allow communications of the requested bandwidth. Such modification causes an increase in cast for each node and link. As shown in FIG. 2, a cost increase of a NODE(1) is indicated by $\Delta C(i)$ and a cost increase of a LINK$(i,j)$ between NODE$(i)$ and NODE$(j)$ is indicated by $\Delta C(i,j)$. The details of cost increase will be described hereinafter.

Figure 3A:
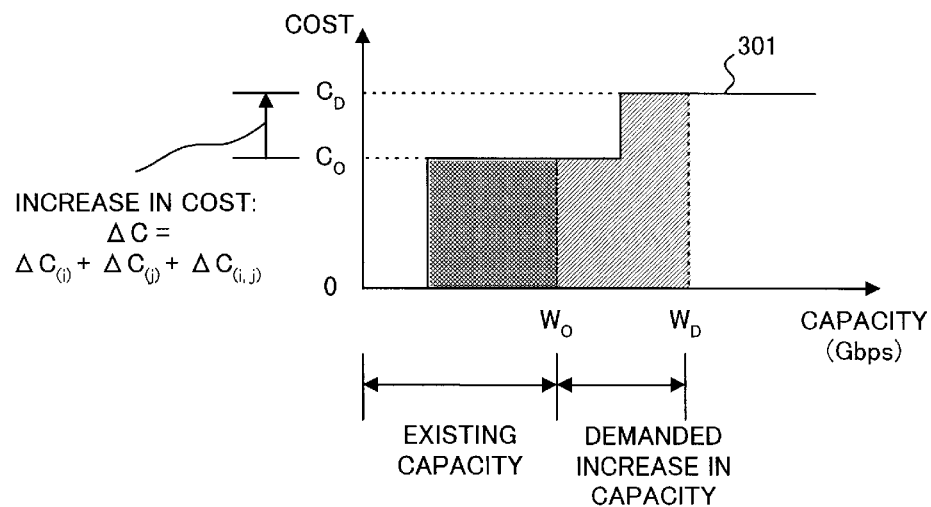
FIG. 3A is a diagram showing a cost function with respect of required bandwidth for each link connecting two adjacent nodes.

Referring to FIG. 3A, consider that NODE$(i)$ and NODE $(j)$ are provided with a switch having a capacity of bandwidth $W_D$ and then a bandwidth $W_D$ wider than $W_0$ is demanded of that node. To satisfy the requirement of the bandwidth $W_D$, the NODE$(i)$ and NODE$(j)$ must be upgraded to at least the capacity of bandwidth $W_D$. Introducing the higher-capacity switch causes a node cost increase indicated by $\Delta C = \Delta C(i) + \Delta C(j)$ according to a cost curve 301.

In general, since it is the same with a LINK$(i,j)$ between them, a cost increase is indicated by $\Delta C = \Delta C(i) + \Delta C(j) + \Delta C(i,j)$. In the case where one of the nodes has already satisfied the demand, the corresponding cost increase $\Delta C(i)$ or $\Delta C(j)$ is zero. Similarly, when the link has already satisfied the demand, the corresponding cost increase $\Delta C(i,j)$ is zero.

To describe more specifically, assuming that the node is equipped with a 5-Gbps switch and the capacity of the node can be upgraded to 7-Gbps or 20-Gbps by replacing the 5-Gbps switch with the 7-Gbps or 20-Gbps snitch or by adding an extended module to the 5-Gbps switch. And further assuming that a bandwidth of 3 Gbps has been occupied, resulting in an available bandwidth of 2 Gbps left in that node.

Figure 3B:
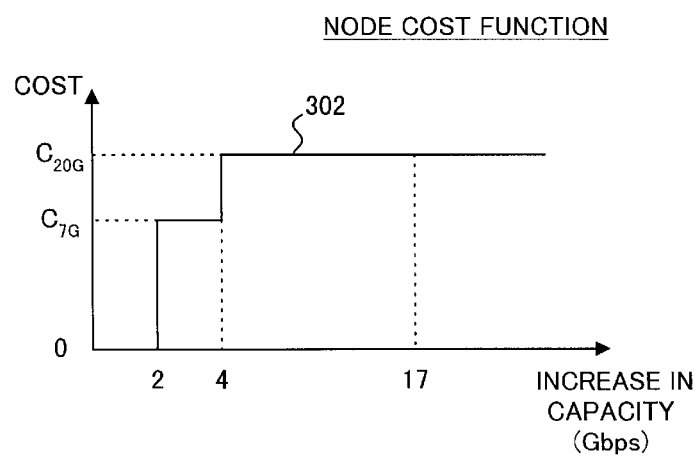
FIG. 3B is a diagram showing a cost function with respect of increase in bandwidth in the case where a 7-Gbps switch or a 20-Gbps switch is introduced to a node in place of a 5-Gbps switch.

In this case, as shown in FIG. 3B, the node can accommodate an increase in bandwidth up to 2 Gbps without the need of additional cost. When a bandwidth increase due to the demand is more than 2 Gbps and not more than 4 Gbps, the 7-Gbps switch is introduced to the node, so that the cost increases to the introduction cost $C_{7C}$. When a bandwidth increase due to the demand is more than 4 Gbps and not more than 17 Gbps, the 20-Gbps switch is introduced to the node, so that the cost further increases to the introduction cost $C_{20G}$. Therefore, the cost function for each node is a step-like function 302 depending on the existing capacity and activity of the node.

As described before, in the case of the demand D(1,4) as shown in FIG. 2, there are four possible route candidates as follows:

1) first route candidate: NODE1-NODE2-NODE3-NODE4, 2) second route candidate: NODE1-NODB2-NODE4.

3) third route candidate: NODE1-NODB3-NODB4, and 4) fourth route candidate: NODE1-NODE3-NODE2-NODE4.

Among the four possible route candidates, an optimal route is selected with respect to cast increase. Assuming that a cost increase in two adjacent nodes NODE$(i)$ and NODE$(j)$ and the LINK$(i,j)$ is represented by $\Delta C = \Delta C(i) + \Delta C(j) + \Delta C(i,j)$ and a network cost increase in all nodes included in a selected route for each demand $D_I$ is represented by $\Delta C_{NT}$ and, the first route candidate costs a network cost increase $\Delta C_{NT1} = \Delta C(1) + \Delta C(2) + \Delta C(3) + \Delta C(4) + \Delta C(1,2) + \Delta C(2,3) + \Delta C(3,4)$, the second route candidate costs a network cost increase $\Delta C_{NT2} = \Delta C(1) + \Delta C(2) + \Delta C(4) + \Delta C(1,2) + \Delta C(2,4)$, the third route candidate costs a network cost increase $\Delta C_{NT3} = \Delta C(1) + \Delta C(3) + \Delta C(4) + \Delta C(1,3) + \Delta C(3,4)$, and the fourth route candidate costs a network cost increase $\Delta C_{NT4} = \Delta C(1) + DG(3) + \Delta C(2) + \Delta C(4) + \Delta C(1,3) + \Delta C(2,3) + \Delta C(2,4)$.

There is selected an optimal route having the minimum network cost increase. Far example, when the second route candidate is the optimal route, the respective settings and capabilities of NODE1, NODE2 and NODE4 and LINK(1, 2) and LINK(2,4) are modified to allow communications of the requested bandwidth. Such an optimal route can be searched for using well-known Dijkstra algorithm (see "Algorithms" written by Robert Sedgewick, second edition, Addison Weslep, pp.461–465).

NETWORK DESIGNING

The network designing section 103 inputs the collected network information from the network database 102 and redesigns the network so as to satisfy the user demands. The minimum cost route is obtained by solving a kind of minimum cost flow problem in a network. Therefore, even though the respective optimal routes satisfying a plurality of demands are obtained, a combination of the optimal routes is not always the optimal solution for the whole network. Then, according to the present invention, the network designing section 103 first performs a local minimum cost route determination procedure and then n whole-network-minimum cost route determination procedure.

Figure 4:
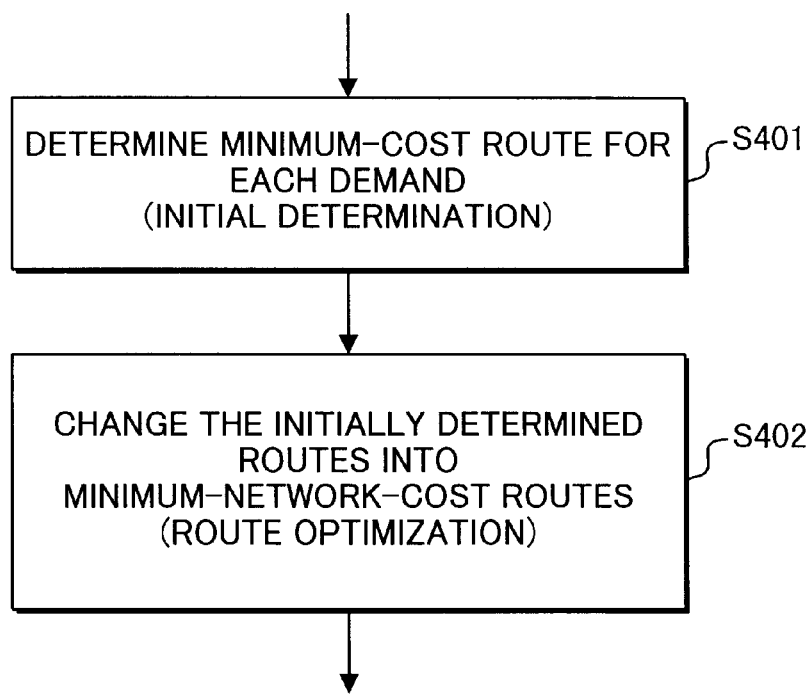
FIG. 4 is a flow chart showing a schematic operation of the network designation section

Referring to FIG. 4, upon receipt of N user demands $D_1$–$D_N$ from the user interface 105, the network designing section 103 performs an initial determination procedure which determines the minimum-cost route fat each demand which is selected in decreasing order of requested bandwidth (step 501).

Subsequently, the network designing section 103 performs a route optimization procedure which optimizes the initially-determined routes so that the total network cost increase is reduced to the minimum value (step S402). As will be describer a network cost increase is minimized by removing each demand from the network and determining a minimum-cost route for the removed demand in the state of the network from which the demand has been removed. Thereafter, if it is determined whether the total network cost increase is minimized and, if it is not minimized, the route optimization steps are repeatedly performed until the total network cost increase is minimized. In this manner, the optimal modification of the network information can be obtained. The details will be described hereinafter.

INITIAL DETERMINATION

Figure 5:
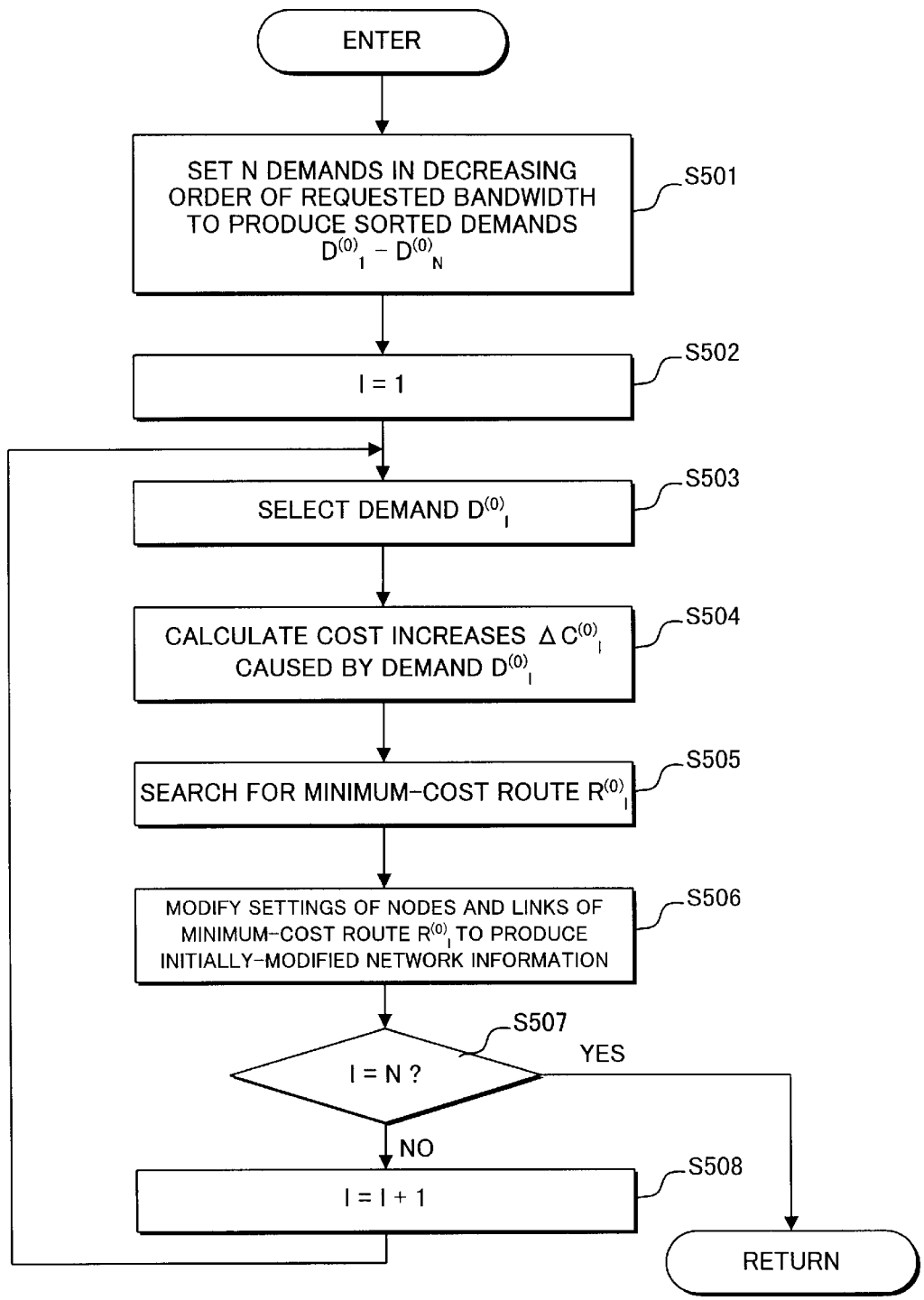
FIG. 5 is a flow chart showing an initial determination routine performed by the network designing section.
Figure 6:
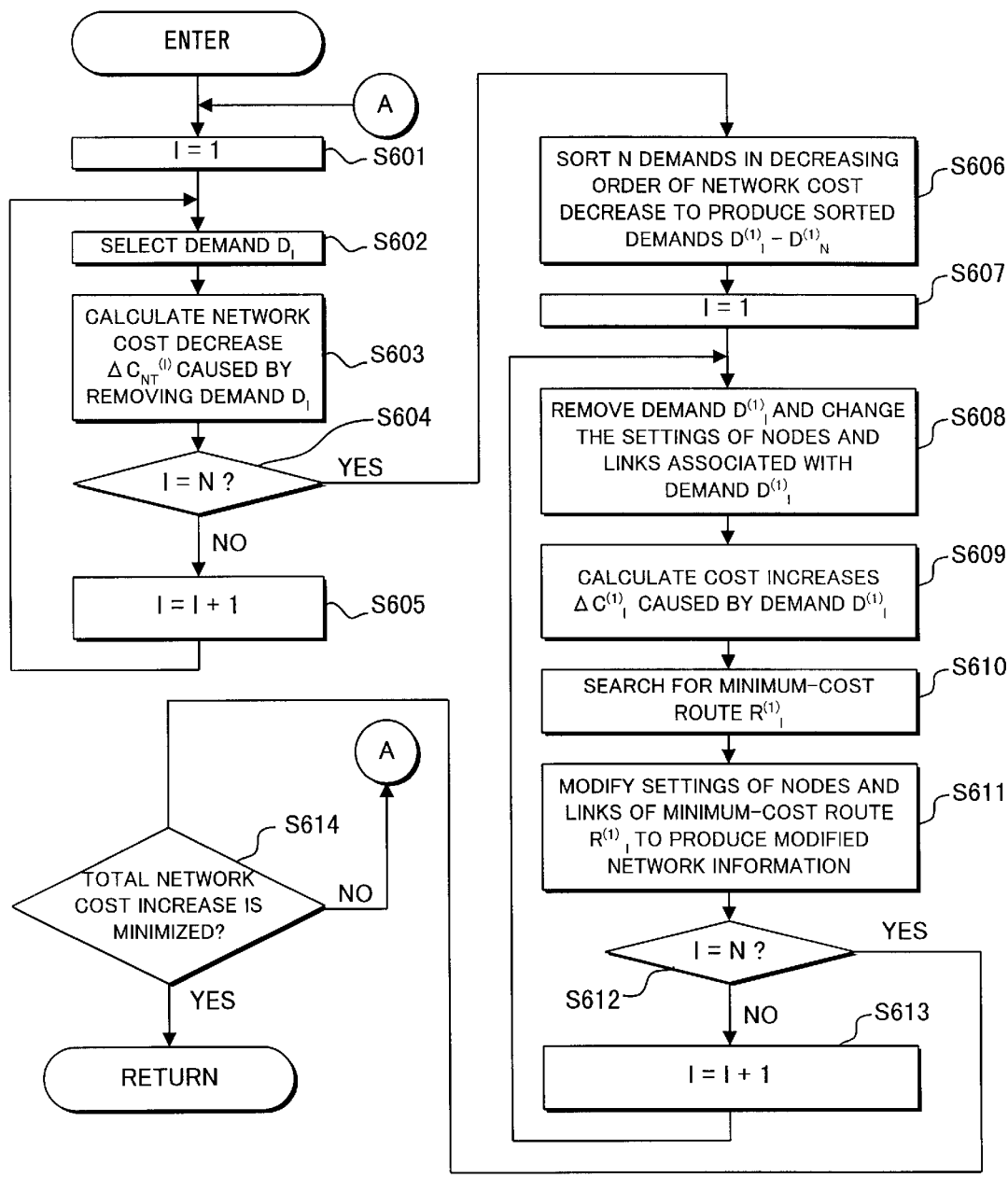
FIG. 6 is a flow chart showing a route optimization routine performed by the network designing section.

Referring to FIG. 5, when receiving N user demands $D_1$–$D_N$ from the user interface 105, the network designing section 103 stores the N user demands $D_1$–$D_N$ onto a memory and sorts them in decreasing order of requested bandwidth to produce the sorted demands $D^{(0)}_1$–$D^{(0)}_N$ (step S501). After a variable I is initialized (step S502), a demand $D^{(0)}_I$ is read from the memory (step S503) and then cost increases $\Delta C^{(0)}_I$ of possible route candidates which would be caused by the selected demand $D^{(0)}_I$ are calculated as described before referring to FIG. 2 and FIGS. 3A and 3B (step S504). Among the possible route candidates, the minimum-cost increase route $R^{(0)}_I$ is searched for as an optimal route using the Dijkstra algorithm (step S505).

Thereafter, the settings of the nodes and links forming the minimum-cost increase route $R^{(0)}{}_I$ are modified to satisfy the demand $D^{(0)}{}_I$ (step S506). The initially-modified network information is temporarily stored onto the memory. It is determined whether the variable I reaches N (step S507) and, if not, the variable I is incremented by one (step S508), then control goes back to the step S503. The stops S503–S508 are repeatedly performed until the variable I reaches N (YES in step S507). In this manner, the initially-modified network information including the respective minimum-cost increase routes $R^{(0)}{}_1$–$R^{(0)}{}_N$ for all the sorted demands $D^{(0)}{}_1$–$D^{(0)}{}_N$ are obtained and stored in the memory.

ROUTE OPTIMIZATION

Subsequently, the network designing section 103 performs the route optimization procedure which optimizes the initially-determined routes $R^{(0)}{}_1$–$R^{(0)}{}_N$ so that the total network cost increase is minimized.

First, the network designing section 103 sorts the N user demands in a different way from the step S501 of the initial determination procedure. After a variable I is initialized (step S601), a demand $D_I$ is read from the memory (step S602). Then the network deigning section 103 removes the demand $D_I$ from the initially-modified network information stored in the memory and calculates a network cast decrease $\Delta C_{NT}(I)$, which would be caused by removing the selected demand $D_I$ (step S603). It is determined whether the variable I reaches N (step S604) and, if not, the variable I is incremented by one (step S605), then control goes back to the step S602. The steps S602–S605 are repeatedly performed until the variable I reaches N (YES in step S604).

In this manner, the respective network cost decreases $C_{NT}(1)$–$\Delta C_{NT(N)}$ for all the demands $D_1$–$D_N$ are obtained. Thereafter, the network designing section 103 sorts the N user demands $D_1$–$D_N$ in decreasing order of network cost decrease to produce the sorted demands $D^{(1)}{}_1$–$D^{(1)}{}_N$ (step S606).

Subsequently, after a variable I is initialized (step S607), a demand $D^{(1)}{}_I$ is read from the memory. Then the bandwidths and other settings of the nodes and links associated with the demand $D^{(1)}{}_I$ are removed from the initially-modified network information to produce a changed network information (step S608). Under this condition, the demand $D^{(1)}{}_I$ is input again. As described before, cost increases $\Delta C^{(1)}{}_I$ of possible route candidates which would be caused by the demand $D^{(1)}{}_I$ are calculated (step S609). Among the possible route candidates, the minimum-cost increase route $R^{(1)}{}_I$ is searched for as an optimal route using the Dijkstra algorithm (step S610).

Thereafter, the settings of the nodes and links forming the minimum-cost increases route $R^{(1)}{}_I$ are modified to satisfy the demand $D^{(1)}{}_I$ and the modified network information is stored onto the memory (step S611). It is determined whether the variable I reaches N (step S612) and, if not, the variable I is incremented by one (step S613), then control goes back to the step S608. The steps S608–S613 are repeatedly performed until the variable I reaches N (YES in step S612). In this manner, the modified network information including the respective minimum-cost increase routes $R^{(1)}{}_1$–$R^{(1)}{}_N$ for all the sorted demands $D^{(1)}{}_1$–$D^{(1)}{}_N$ are obtained and stored in the memory.

Thereafter, if the variable I reaches N (YES in step S612), then it is determined whether the total network cost increase is minimized (step S614) and the route optimization steps S601–S613 are repeatedly performed until the total network cost increase is minimized. In this manner, the optimal modification of the network information can be obtained and the modified network information is output to the network database 102.

Figure 7:
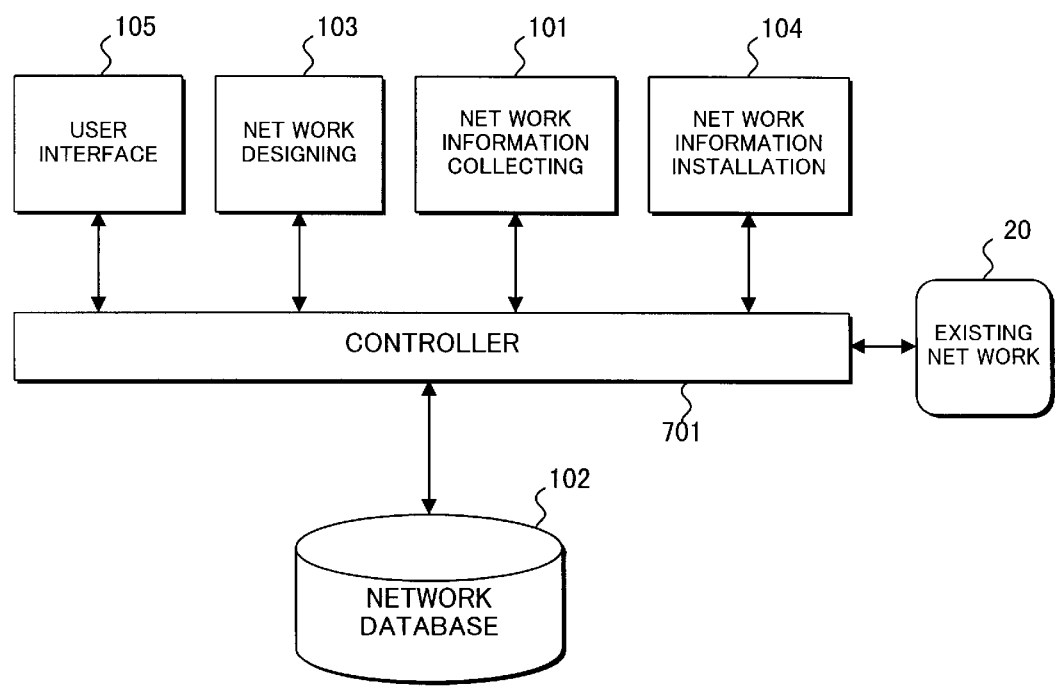
FIG. 7 is a block diagram showing a network management system according to a second embodiment of the present invention.
Figure 8:
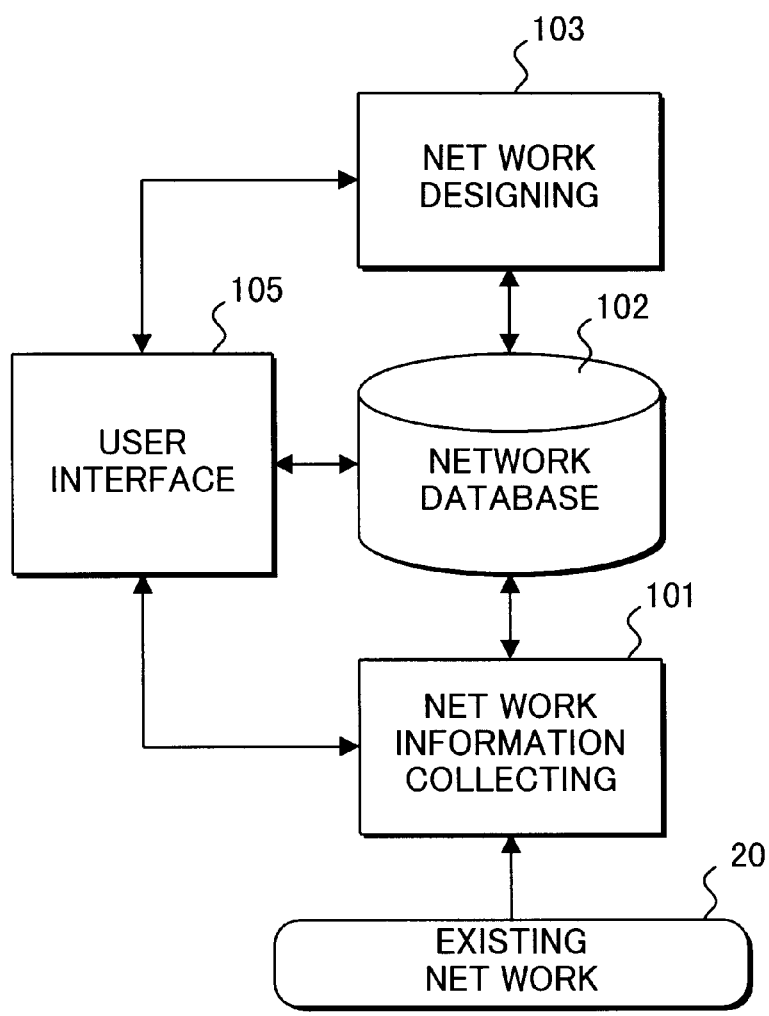
FIG. 8 is a block diagram showing a network management system according to a third embodiment of the present invention.
Figure 9:
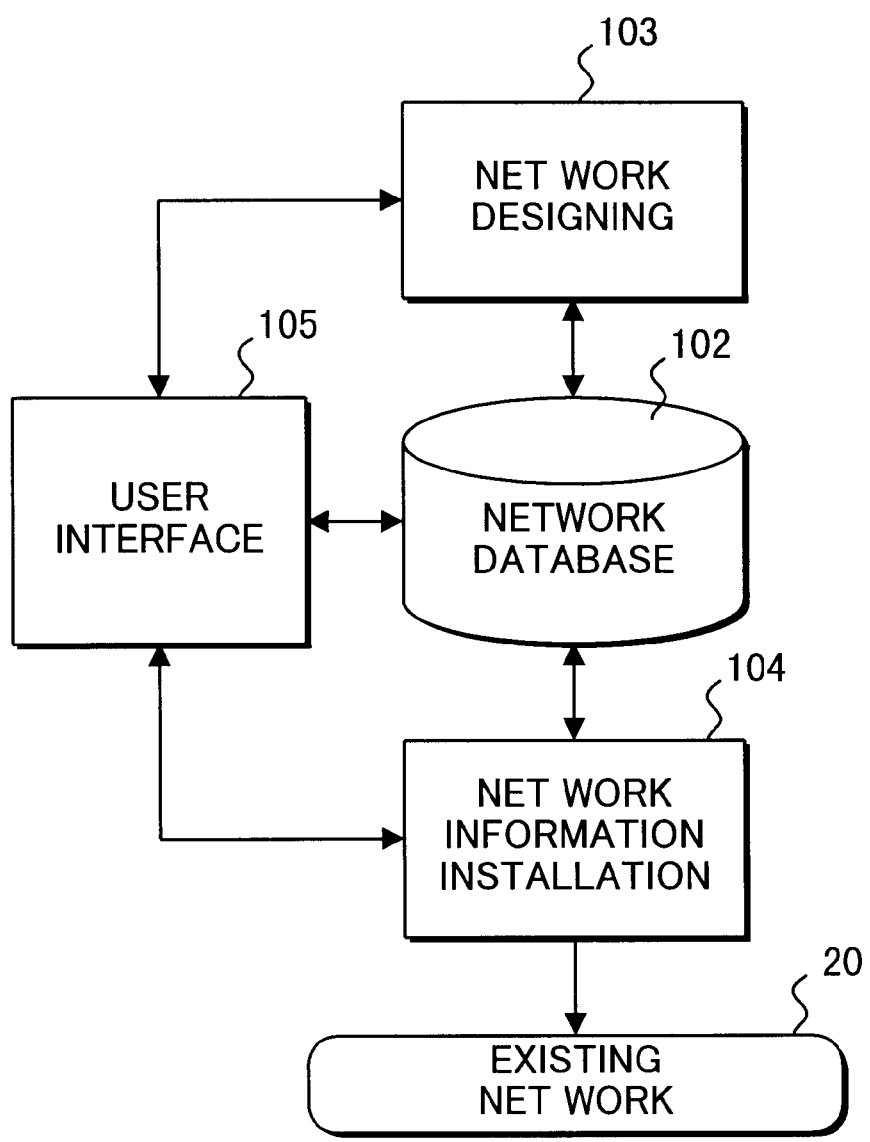
FIG. 9 is a block diagram showing a network management system according to a fourth embodiment of the present invention.

Variations of the network management system 10 are shown in FIGS. 7–9 In FIG. 7, the system 10 is provided with a controller 701 which controls the network information collecting section 101, the network database 102, the network designing section 103, and the network information installation section 104. Further the controller 701 is provided with a communication means for communicating the existing network 20. Since the functions and operations of these sections are the same as in FIG. 1, the descriptions are omitted.

In FIG. 8, the system 10 has the same configuration as in FIG. 1 but the network information installation section 104. In this embodiment the network information installation is performed offline. Contrarily, the system 10 as shown in FIG. 9, the system 10 has the same configuration as in FIG. 1 but the network information collecting section 101. In this embodiment, the network information of the existing network 20 is collected offline.

I claim:

1. A method for providing management of a network, comprising the steps of:
   a) storing network information of the network for retrieval;
   b) inputting a plurality of demands each for a change of performance of the network; and
   c) providing a modified design of the network based on the network information to satisfy the demands by
      c-1) producing an initially-modified design of the network by determining a minimum-cost route for each of the demands, the minimum cost routes for each of the demands being summed to produce a total cost of the initially-modified design of the network; and
      c-1-i) selecting one of the demands in decreasing order of increase in performance bandwidth; and
      c-1-ii) producing the initially-modified design of the network by determining a minimum-cost route for a first selected demand, and by
   c-2) optimizing the initially-modified design to produce the modified design by changing the minimum-cost route for each of the demands so as to minimize the total cost of the modified design of the network by
      c-2-i) selecting one of the demands in decreasing order of amount of cost decrease which would be caused by removing a demand from the initially-modified design; and
      c-2-ii) removing a second selected demand from the initially-modified design to produce a temporary design; and
   producing the modified design by determining a minimum-cost route for the second selected demand based on the temporary design.

2. The method according to claim 1, wherein the demands are selected by the steps of selecting a demand for performing steps c-1) and c-2), and selecting another demand for performing steps c-1) and c-2).

3. A method for providing management of a network comprising the steps of:
   a) storing network information of the network for retrieval;
   b) inputting a plurality of demands each for a change of performance of the network wherein each of the demands specifies two network elements and a required amount of traffic between the two network elements; and c) providing a modified design of the network based on the network information to satisfy the demands by c-1) determining a first route between the two network elements for each of the demands to produce a set of first routes in the network, wherein the first route provides minimum cost of changing settings of network elements between the two network elements included; and c-2) changing the first route to a second route between the two network elements for each of the demands based on the set of first routes so that the second route provides minimum network cost of changing settings of network elements between the two network elements included.

4. The method according to claim 3, wherein the demands are selected by the steps of selecting a demand for performing steps c-1) and c-2), and selecting another demand for performing steps c-1) and c-2).

5. The method according to claim 3, wherein the step c-1) comprises the steps of:

selecting one of the demands in decreasing order of the required amount of traffic; and producing the set of first routes by determining a minimum-cost route for a first selected demand, and the step c-2) comprises the steps of:

selecting one of the demands in decreasing order of amount of cost decrease which would be caused by removing a demand from the set of first routes;

removing a second selected demand from the set of first routes to produce a partially removed set of the first routes; and producing the modified design by determining a minimum-cost route for the second selected demand based on the partially removed set of the first routes.

6. A system for providing management of a network, comprising:

a storage for storing network information of the network for retrieval;

an input device for inputting a plurality of demands each for a change of performance of the network; and a network designer for providing a modified design of the network based on the network information to satisfy the demands, wherein each of the demands specifies two network elements and a required amount of traffic between the two network elements, the network designer determines a first route between the two network elements for each of the demands to produce a set of first routes in the network, and wherein the first route provides minimum cost of changing settings of network elements between the two network elements included, and then changes the first route to a second route between the two network elements for each of the demands based on the set of first routes so that the second route provides minimum network cost of changing settings of network elements between the two network elements included.

7. The system according to claim 6, wherein the network designer produces an initially-modified design of the network by determining a minimum-cost route for each of the demands, the minimum-cost routes for each of the demands being summed to produce a total cost of the initially-modified design of the network, and then optimizes the initially-modified design to produce the modified design by changing the minimum-cost route for each of the demands so as to minimize the total cost of the modified design of the network.

8. The system according to claim 7, wherein the network designer selects one of the demands in decreasing order of increase in demanded bandwidth, produces the initially-modified design of the network by determining a minimum-cost route for a first selected demand, and then the network designer selects one of the demands in decreasing order of amount of cost decrease which would be caused by removing a demand from the initially-modified design, removes a second selected demand from the initially-modified design to produce a temporary design, and produces the modified design by determining a minimum-cost route for the second selected demand based on the temporary design.

9. The system according to claim 6, wherein the network designer selects one of the demands in decreasing order of the required amount of traffic, and produces the set of first routes by determining a minimum-cost route for a first selected demand, and then the network designer selects one of the demands in decreasing order of amount of cost decrease which would be caused by removing a demand from the set of first routes, removes a second selected demand from the set of first routes to produce a partially removed set of the first routes, and produces the modified design by determining a minimum-cost route for the second selected demand based on the partially removed set of the first routes.

10. A method for providing management of a network, comprising the steps of:

a) storing network information of the network for retrieval;

b) inputting a plurality of demands each for a change of performance of the network; and c) producing an initially-modified design of the network by determining a minimum-cast route for each of the demands;

d) selecting one of the demands in decreasing order of amount of cost decrease which would be caused by removing a demand from the initially-modified design;

e) removing a second selected demand from the initially-modified design to produce a variable network design;

f) producing a modified design by determining a minimum-cost route for the second selected demand based on the variable network design; and g) repeating the steps d) to f) to minimize total cost of the modified design of the network based on the variable network design.

11. The method according to claim 10, wherein each of the demands specifies two network elements and a required amount of traffic between the two network elements.

* * * * *